(12) United States Patent
de Lespinois et al.

(10) Patent No.: US 9,523,209 B2
(45) Date of Patent: Dec. 20, 2016

(54) IMMERSIVE THEATER

(71) Applicant: Vision 3 Experiential LLC, Los Angeles, CA (US)

(72) Inventors: Pierre J. de Lespinois, Pacific Palisades, CA (US); John E. Sullivan, Woodland Hills, CA (US)

(73) Assignee: Vision 3 Experiential, LLC, Los Angeles, CA (US)

( * ) Notice: Subject to any disclaimer, the term of this patent is extended or adjusted under 35 U.S.C. 154(b) by 0 days.

(21) Appl. No.: 14/713,897

(22) Filed: May 15, 2015

(65) Prior Publication Data

US 2016/0333597 A1 Nov. 17, 2016

(51) Int. Cl.
| | |
|---|---|
| *E04H 3/10* | (2006.01) |
| *E04H 3/22* | (2006.01) |
| *E04B 1/346* | (2006.01) |
| *E04B 1/343* | (2006.01) |
| *G03B 21/56* | (2006.01) |
| *G03B 21/606* | (2014.01) |
| *G03B 37/04* | (2006.01) |
| *E04B 1/00* | (2006.01) |

(52) U.S. Cl.
CPC .................. *E04H 3/22* (2013.01); *E04B 1/343* (2013.01); *E04B 1/346* (2013.01); *G03B 21/562* (2013.01); *G03B 21/606* (2013.01); *G03B 37/04* (2013.01); *E04B 2001/0053* (2013.01)

(58) Field of Classification Search
CPC ................ E04H 3/22; E04H 3/30; E04H 3/24; E04H 3/12; A47C 1/121; E04B 1/346; E04B 1/343; E04B 2001/0053
USPC ...... 52/8–10, 89; 472/45, 57, 59–60, 75, 76, 472/80
See application file for complete search history.

(56) References Cited

U.S. PATENT DOCUMENTS

| | | | | |
|---|---|---|---|---|
| 3,469,837 | A | | 9/1969 | Heilig, M. L. |
| 3,539,249 | A | * | 11/1970 | Jaulmes .................... E04H 3/10 |
| | | | | 252/69 |
| 3,972,527 | A | * | 8/1976 | Bacon ...................... A63G 9/16 |
| | | | | 472/16 |

(Continued)

FOREIGN PATENT DOCUMENTS

| | | |
|---|---|---|
| WO | WO-99/56173 | 11/1999 |
| WO | WO-02/079858 | 10/2002 |

OTHER PUBLICATIONS

Fraser, Paul "Imersa—Dome Convergence", http://www.imersa.org/resources/articles/item/dome-convergence-by-paul-fraser-2, (Oct. 31, 2012).

(Continued)

*Primary Examiner* — Beth Stephan
(74) *Attorney, Agent, or Firm* — Tsircou Law, P.C.

(57) ABSTRACT

An immersive theater is provided having a screen oriented with respect to a pitched seating area to provide an immersive theater experience for all of the viewers. The theater can include a three-dimensional, concave shaped screen, defining a central axis that extends perpendicularly from the center point of the concave screen directed toward the seating area. The screen is oriented at a prescribed pitch angle ($\alpha$) relative to the horizontal. The theater has a seating area having a plurality of seats for viewers and is set up in a stacked arrangement along a planar region and pitched at a prescribed angle ($\beta$). The seating area is further confined within a viewing area that is centered on the central axis of the screen.

24 Claims, 12 Drawing Sheets

(56) References Cited

U.S. PATENT DOCUMENTS

| | | | | |
|---|---|---|---|---|
| 4,464,029 A * | 8/1984 | Jaulmes | | G09B 9/304 352/132 |
| 4,643,416 A * | 2/1987 | van der Veen | | A63G 9/08 472/3 |
| 4,874,162 A * | 10/1989 | Trumbull | | A63G 31/16 352/85 |
| 4,879,849 A * | 11/1989 | Hollingsworth, III | | A63J 25/00 472/60 |
| 4,885,878 A * | 12/1989 | Wuu | | E04H 3/22 348/121 |
| 5,192,247 A * | 3/1993 | Barr | | A63G 31/16 472/60 |
| 5,433,670 A * | 7/1995 | Trumbull | | A63G 31/16 352/85 |
| 5,611,174 A * | 3/1997 | Hayashi | | G09B 9/323 353/94 |
| 5,724,775 A | 3/1998 | Zobel, Jr. et al. | | |
| 5,762,413 A | 6/1998 | Colucci et al. | | |
| 5,829,201 A * | 11/1998 | Schelter | | A47C 1/124 414/921 |
| 5,845,434 A | 12/1998 | Hayashi | | |
| 5,951,406 A * | 9/1999 | Steane | | A63G 11/00 434/194 |
| 6,280,341 B1 * | 8/2001 | Hayashi | | A63J 13/00 434/55 |
| 6,354,954 B1 | 3/2002 | Sumner | | |
| 6,530,667 B1 * | 3/2003 | Idaszak | | G09B 9/32 348/121 |
| 6,533,670 B1 * | 3/2003 | Drobnis | | A63G 31/16 434/55 |
| 6,727,971 B2 | 4/2004 | Lucas | | |
| 6,733,136 B2 * | 5/2004 | Lantz | | H04N 9/3141 348/36 |
| 6,880,939 B2 | 4/2005 | Colucci et al. | | |
| 6,909,543 B2 * | 6/2005 | Lantz | | G03B 21/56 348/36 |
| 8,225,555 B2 | 7/2012 | Magpuri | | |
| 8,416,495 B2 | 4/2013 | Iwamasa | | |
| 8,641,540 B2 | 2/2014 | Feuer et al. | | |
| 8,992,336 B2 * | 3/2015 | Magpuri | | E04H 3/22 472/130 |
| 2002/0131018 A1 | 9/2002 | Lucas | | |
| 2002/0141053 A1 * | 10/2002 | Colucci | | G02B 27/18 359/435 |
| 2005/0014567 A1 * | 1/2005 | Li | | A63G 31/16 472/60 |
| 2007/0193123 A1 * | 8/2007 | Magpuri | | E04H 3/22 52/8 |
| 2009/0132925 A1 | 5/2009 | Koehler et al. | | |
| 2009/0141190 A1 | 6/2009 | Kroll | | |
| 2010/0197417 A1 * | 8/2010 | May | | A63G 11/00 472/106 |
| 2011/0203190 A1 * | 8/2011 | Magpuri | | A63G 31/16 52/10 |
| 2012/0247030 A1 | 10/2012 | Magpuri | | |
| 2014/0232613 A1 | 8/2014 | Fox et al. | | |
| 2015/0018107 A1 | 1/2015 | Kaastra | | |

OTHER PUBLICATIONS

Jacobson, Jeffrey "Dome Theaters for Education", http://research.adlnet.gov/newsletter/academic/201110.htm, (Oct. 31, 2011).

* cited by examiner

IMMERSIVE THEATER

FIELD OF THE INVENTION

The present invention relates generally to theaters and, more particularly, to an immersive theater.

BACKGROUND OF THE INVENTION

The goal of immersive theaters is to make the viewers truly feel as though they are physically present and experiencing the depicted imagery in real life. Various immersive-type theaters exist. These theaters attempt to trick the audience into forgetting that they are in a theater and allow their senses to convince themselves that they are actually there. Many of these theaters utilize either standard stadium seating or a suspended seating configuration and consist of a curved screen that occupies a portion of the viewer's line of sight.

When a screen's edges are visible to a viewer, it is apparent to the viewer that he is looking at a screen, and the immersive aspect is lost. The edges create a drastic disparity from the images on the screen and the darkness beyond the edges of the screen. Certain theaters position the seats close to the screen. Disadvantageously, when the seats are positioned in this manner, not all viewers experience the same quality of immersion. It can be difficult for the viewers to take in the imaging in its entirety; rather, this type of configuration forces the viewer to focus on just a portion of the imaging.

Therefore, there remains a considerable need for an immersive theater experience having a screen that occupies the entirety of the viewers' line of sight that can efficiently seat a number of viewers relative to the screen size, while providing the same quality of immersive experience to each seat, regardless of its position in the seating arrangement.

SUMMARY OF THE INVENTION

Briefly, and in general terms, the invention provides an immersive theater having a screen oriented with respect to a pitched seating area to provide an immersive theater experience for all of the viewers.

More specifically, in an exemplary embodiment, the theater has a three-dimensional, concave shaped screen, defining a central axis that extends perpendicularly from the center point of the concave screen directed toward the seating area. The screen is oriented at a prescribed pitch angle ($\alpha$) relative to the horizontal. The theater has a seating area having a plurality of seats for viewers and is set up in a stacked arrangement along a planar region and pitched at a prescribed angle ($\beta$). The seating area is further confined within a viewing area that is centered on the central axis of the screen.

In a detailed aspect of an exemplary embodiment, the theater utilizes a single projector with a hemispherical lens.

In an alternative embodiment, the theater includes a plurality of projectors aimed at the screen from various angles. The theater can further utilize lenses and/or mirrors to achieve a desired coverage, wherein each projector's projection occupies a prescribed segment of the screen. Moreover, the projection of each projector can overlap with adjacent segments in order to provide a seamless image. In yet other embodiments, the screen can comprise one or more a fine pitched LED displays, or fiber optic cloth displays.

In another detailed aspect of an exemplary embodiment, the seats in the viewing area are arranged in rows having an orientation of a curvature ($\delta\theta$) relative to the screen, such that each seat is aimed at the central region of the screen.

In an alternative embodiment, the rows are separated into seat groups; each seat group having one or more seats and a motion simulation apparatus is used to support each seat group from underneath; however, the motion simulation apparatus can support the seat groups from other locations. The motion simulation apparatus is capable of moving each seat group, in unison, up and down, back and forth, and tilting the seat groups to various angles, pitches, and orientations to achieve the desired feeling to be imposed on the audience.

In another detailed aspect of an exemplary embodiment, the theater has a screen having an outer peripheral edge. The central axis is defined on the screen and extends perpendicularly from a center point of the screen with the screen oriented at a prescribed pitch angle ($\alpha$) relative to horizontal. The seating assembly has a loading orientation and a viewing orientation. A first seating area and a second seating area coupled to each other. The seating assembly defines an axis of rotation between the first seating area and the second seating area, such that the seating assembly rotates about the axis of rotation causing the first seating area to raise and the second seating area to lower, in order to achieve the viewing orientation in which the first and second seating areas are positioned at a prescribed pitch angle ($\beta$).

In an alternative embodiment, the first seating area and the second seating area are aligned horizontally in the loading orientation. Additionally, the axis of rotation is parallel to the horizon and transverse to the central axis of the screen.

In another detailed aspect of an exemplary embodiment, the first seating area and the second seating area both include at least one row of seats. The first seating area and the second seating area are coupled together via a rotatable support structure that is mounted to a base support, in which the rotatable support structure rotates about the axis of rotation to achieve the viewing orientation.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
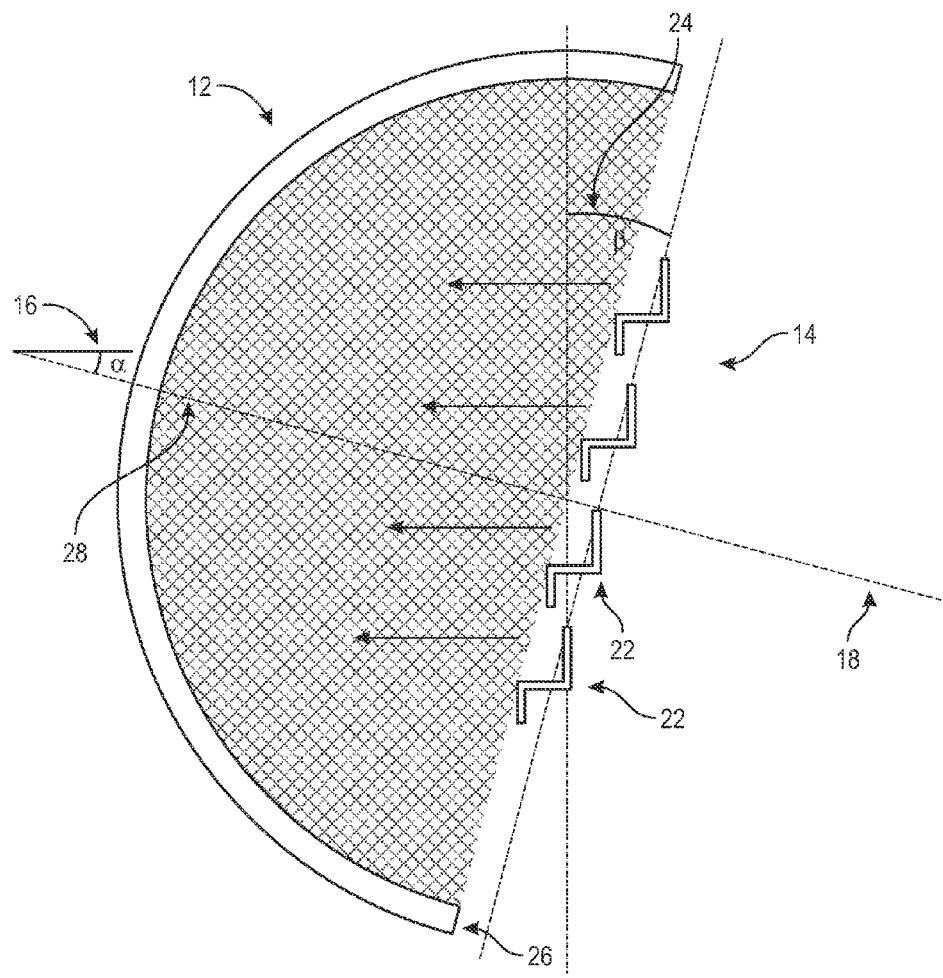
FIG. 1 is a simplified cross-sectional side view of an immersive theater in accordance with the invention.

Referring now to the drawings, and particularly FIG. 1, there is shown side-profile of an immersive theater 10. A concave screen 12 is oriented (angled) towards the seating area 14. The orientation of the screen 12 is measured by a reference angle ($\alpha$) 16 defined by the central axis line 18 of the screen relative to the horizon (ground). The seating area 14 is aligned along the central axis 18, and is positioned such that the screen 12 extends above and over the viewers' heads, below the viewers' feet, and extends to or beyond the viewers' left & right peripheral limits.

FIG. 1 shows the position of the screen 12 relative to the seating area 14. The shape of the screen, as depicted, is three-dimensionally curved and concave. The depicted embodiment has a hemispherically shaped screen 12; however, as described below, the curvature of the screen need not be uniform throughout. For example, the curvature about the periphery of the screen can vary relative to the central region of the screen. Alternatively, the curvature above/below the viewers can vary relative to the central region of the screen.

The screen 12 is three-dimensionally curved and concave-shape oriented towards the audience. The screen 12 is pitched at an angle ($\alpha$) (e.g., 15 degrees) relative to the horizontal. The seating area 14 has rows 20 of seats 22, stacked in a stadium-seating-style arrangement. The seats 22 are oriented at a standard seating position, similar to regular chairs. The seats 22 are arranged such that each row 20 is positioned slightly behind and above the previous row, beginning from the bottom row, up to the top row. The rows 20 of the stadium-seating-style arrangement are at a pitch angle ($\beta$) 24. The seating area 14 and the screen 12 are positioned relative to one another such that the seated viewers' peripheral vision is sufficiently occupied by the outer edges 26 of the screen to create a feeling of immersion.

By orienting the screen 12 at alpha ($\alpha$) angle 16 and the stadium-seating gradient at beta ($\beta$) 24, the screen extends over the heads of the viewers (seats) 22. Although the screen 12 does not necessarily extend underneath the feet of the viewers 22 in this embodiment, their line of sight in that direction is blocked by their own body and/or the row 20 of seats below them, so there is little motivation to look straight down. With the seats positioned at a distance ($\delta$) 28 from the central portion of the screen 12, the viewers' peripherals are occupied by the screen as well. In an exemplary embodiment where the theater is designed to hold 160 seats, the radius of the screen's curvature is 49.6 feet (FIG. 4).

The location of the seating area 14 is confined to the central axis line 18 so that each seat 22 is within a certain distance 28 from the screen 12. The number of rows 20 (height) and the number of seats 22 per row (width) is relative to the size of the screen 12. Confining the seats 22 to a prescribed relationship with the central axis 18 ensures that each seat will experience substantially the same quality of immersion. The standard seating position orientation of the seats 22 allows the focal point of the viewers to be directed at the central region of the screen, while the screen extends to, or beyond, the limit of the viewers' peripheral view.

In the exemplary embodiment, the seats are positioned no closer to the sidewalls than ⅓ the radius of the screen. In the exemplary embodiment, the diameter of the screen is thirty feet, having a radius of fifteen feet, such that the seats are within a ten-foot radius. The seats are arranged in rows having a slight curvature ($\delta\theta$) such that the outer portions of the seating area are oriented slightly inward to feature the center area of the screen, as opposed to the nearest side portion of the screen if the seat were oriented facing straight forward. Since the seating is set back from the cross-sectional in the embodiment using projectors, this results in a seating location at a distance of greater than seven and a half feet.

Figure 2:
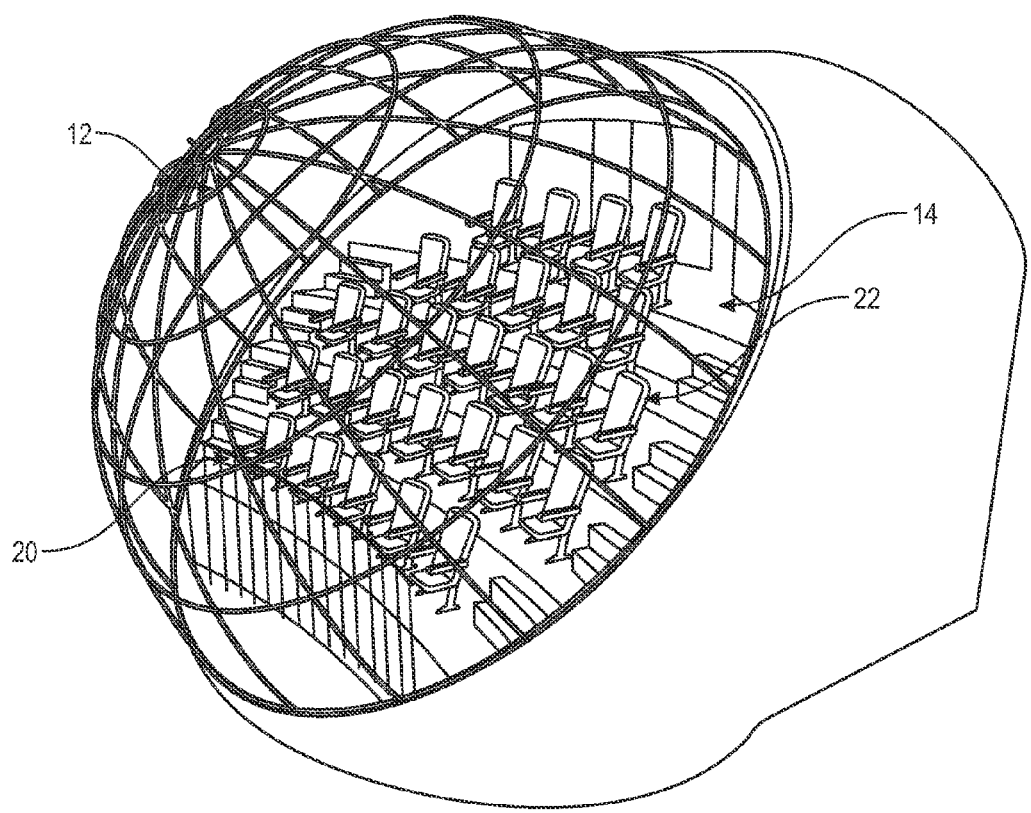
FIG. 2 is a perspective view of a second embodiment of an immersive theater in accordance with the invention.

Referring now to FIG. 2, there is shown a perspective view of an exemplary embodiment of FIG. 1. The seats 22 are arranged in rows 20 and the seats are in standard orientation. The rows are stacked in a stadium-style manner. The alignment of each row has a slight curvature of $\delta\theta$ 130 (shown in FIGS. 4B-C).

Figure 3:
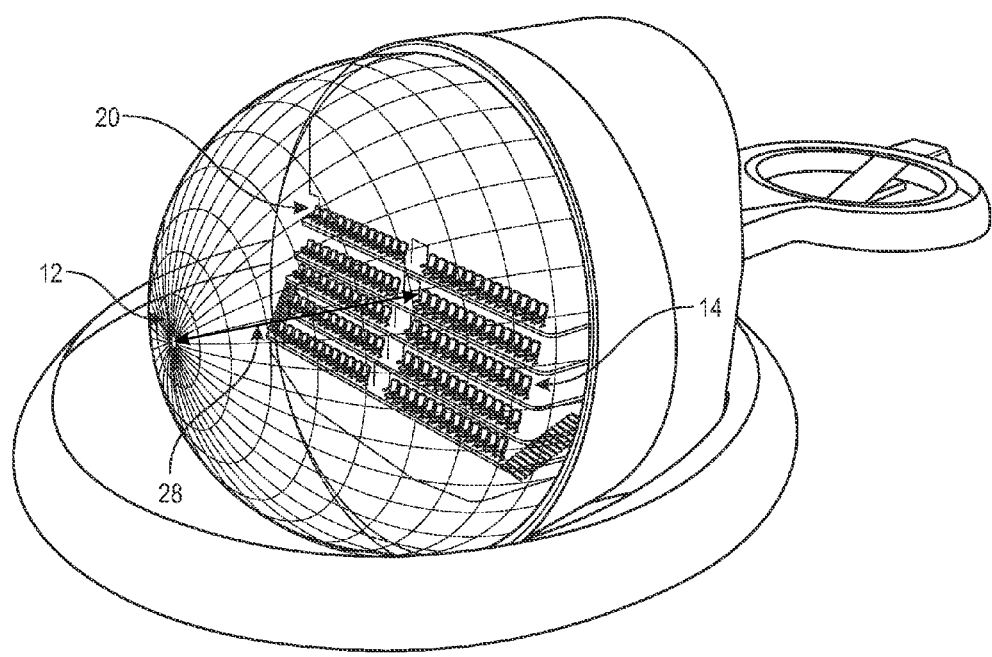
FIG. 3 is a perspective view of a third embodiment of an immersive theater in accordance with the invention.

FIG. 3 is an exemplary embodiment of a large-scale theater capable of holding 160 seats. In the depicted embodiment, the distance from the seats to the central portion of the screen is 49.6 feet. The rows are stacked in a steep pitch stadium-style manner, almost vertically stacked. The screen 12 is hemispherically shaped and angled toward the audience, but not as drastically as depicted in FIG. 2.

FIGS. 4A-G depict a moveable seating array 30 for use in conjunction with the above-described screen 12. The moveable seating array 30 comprises a moveable floor panel 34, a moveable supporting structure 32, and two parallel beams 36 with rows 40 extended therebetween. The seats 38 and respective rows 40 are connected to the moveable supporting structure 32, while the moveable floor panel 34 surrounds the seats and rows. The moveable supporting structure 32 is connected to the parallel beams 36, mounted for lateral movement along the stationary floor 44, which lines the outer edges of the seating assembly 30. This can be accomplished by use of wheels, gears, track and pulley system, etc.

Figure 4A:
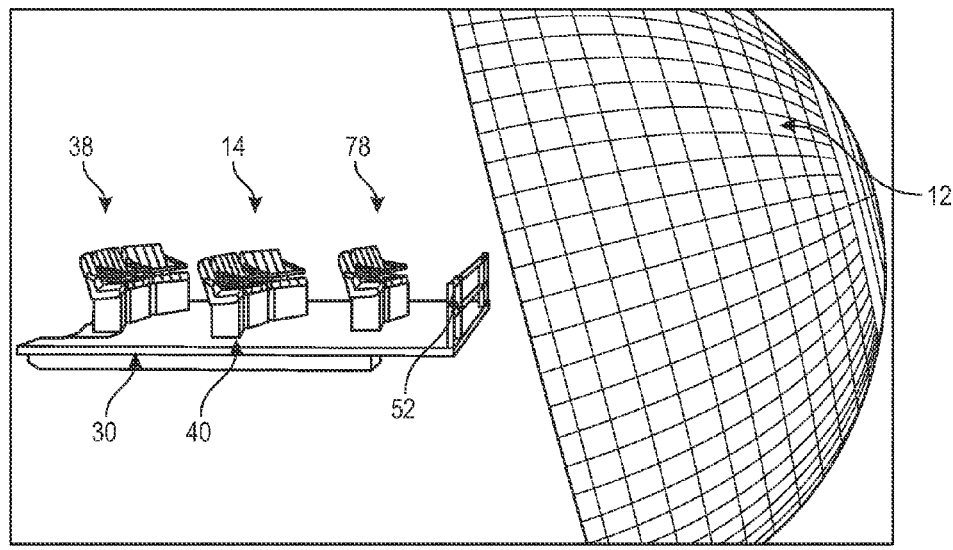
FIGS. 4A-G are a perspective view of the sequential stages of an embodiment relating to a moveable seating assembly of an immersive theater in accordance with the invention.

As shown in FIG. 4A, the seating assembly 30 is in a loading position 48. Each seat 38 has a lap-bar 50, which is shown in the open position to allow viewers to be seated. The guardrail 52 at the front of the seating assembly 30 is in a deployed position while the viewers are being seated.

Figure 4B:
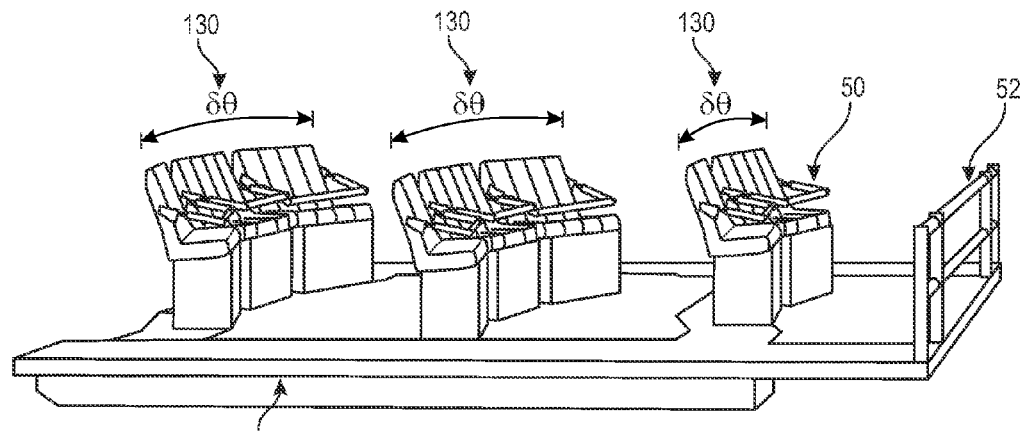

FIG. 4B shows the lap-bar 50 in the closed position. The lap-bar 50 is lowered on each seat to secure each viewer in his/her respective seat 38, once all the viewers are seated. The rows 40 of seats 38 have a slight curvature ($\delta\theta$) 130 relative to the screen 12.

Figure 4C:
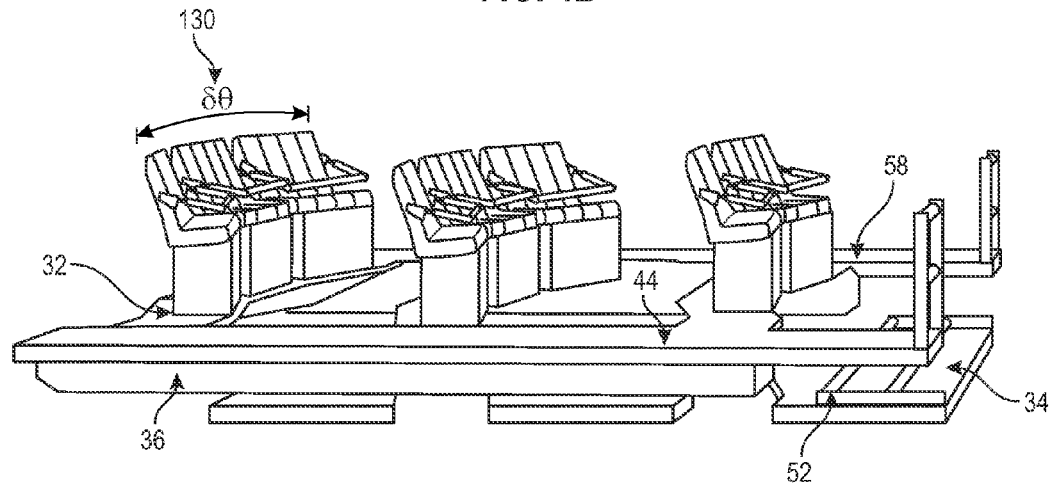

As depicted in FIG. 4C, once all the viewers are secured in their seats 38, the moveable floor panel 34 of the seating assembly 30 drops down below floor level 58, leaving the moveable supporting structure 32 and the seats 38 at floor level 58. As the moveable floor panel 34 is lowered, the guardrail 52 at the front collapses to a stowed position. The outer floor platform 44 of the seating assembly 30 remains stationary at floor level 58, supporting the parallel beams 36.

Figure 4D:
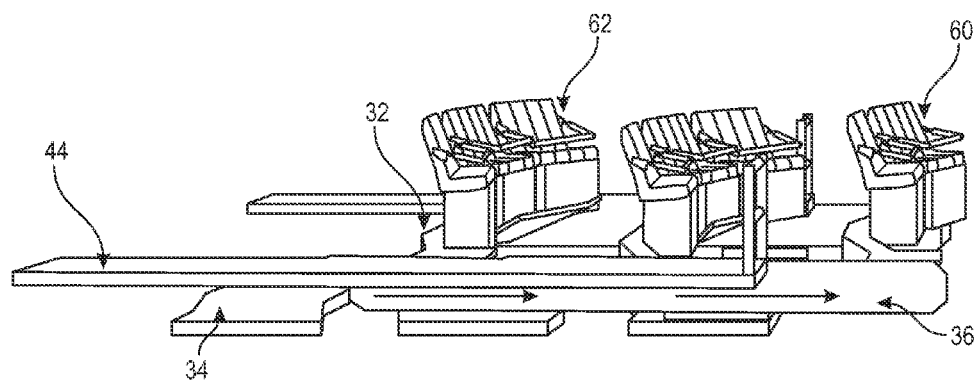

FIG. 4D shows the moveable supporting structure 32 as it is moved forward via the parallel beams 36. The moveable floor panel 34 remains in place in its dropped position.

Figure 4E:
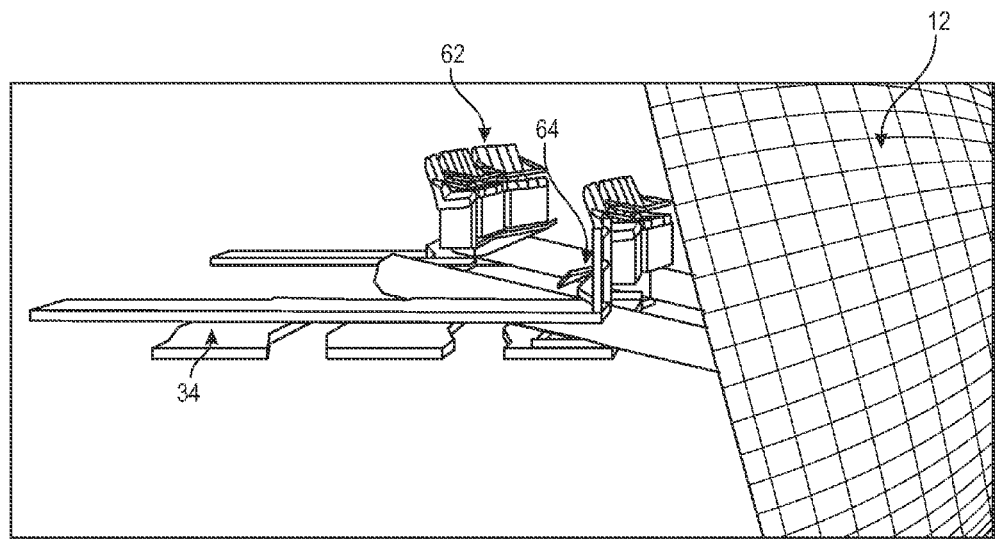
Figure 4F:
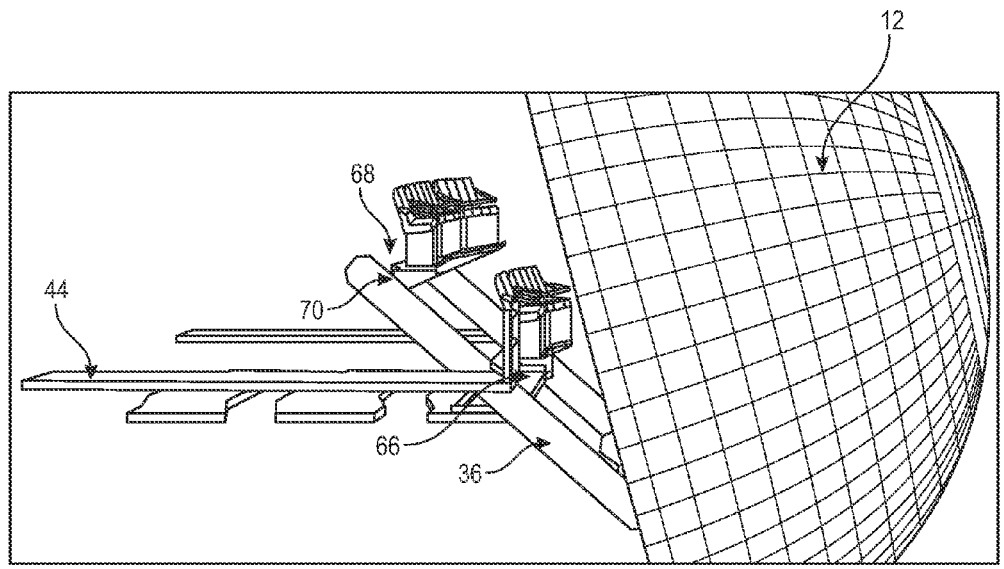
Figure 4G:
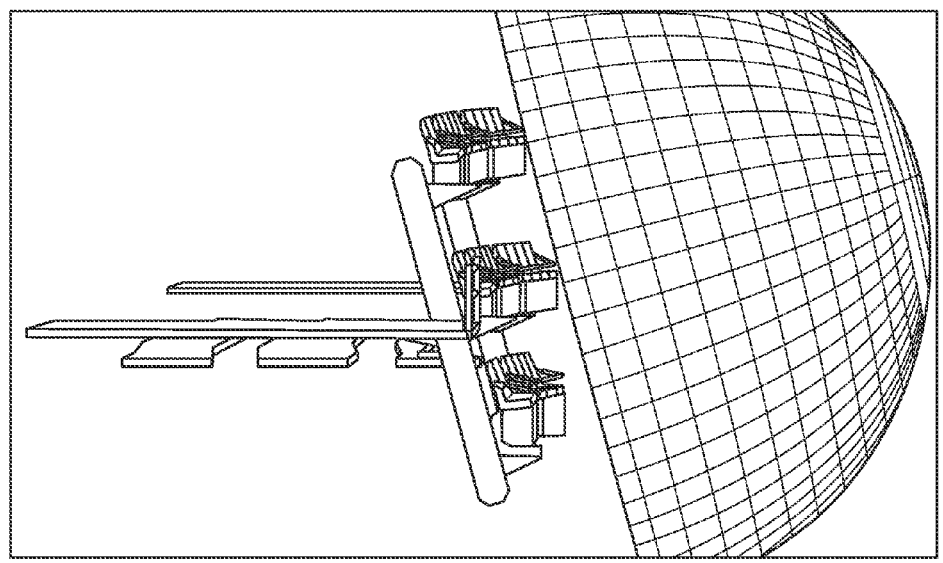

FIGS. 4E-G show the parallel beams 36 as they move forward to a terminal lateral position, and then rotate at a mounted axis of rotation, to bring the moveable supporting structure 32 and its seats 38 into a viewing position. In the depicted embodiment, there are three rows 40 of seats 38. The first row 60 and the third row 62 rotate about the second (middle) row 64. The counter-weighted system 76 rotates the front 60 and back rows 62 about the center row, transitioning the seating assembly from a horizontal (loading) position to a vertical (viewing) position. The parallel beams 36 pivot at their central point (middle row) 64 about a pivot axis 66 located at the front of the outer floor platform 44. A shelf portion 68 supports each row 40 of seats 38 and is configured to pivot about a pivot axis 70 at each side, coupled to the parallel beams 36 to keep the seats 38 in their original orientation. The pivot axis points 70 are configured to controllably rotate the shelf portion 68 of each row. The pivot axis points can, for example, utilize a hydraulic system to control the rotation of the shelf portion 68.

Figure 5A:
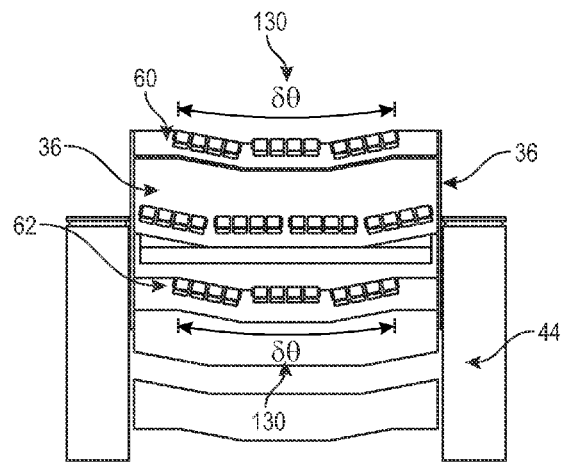
FIGS. 5A-B are a top view of the sequential stages of the embodiment depicted in FIGS. 4A-G relating to a moveable seating assembly of an immersive theater in accordance with the invention.
Figure 5B:
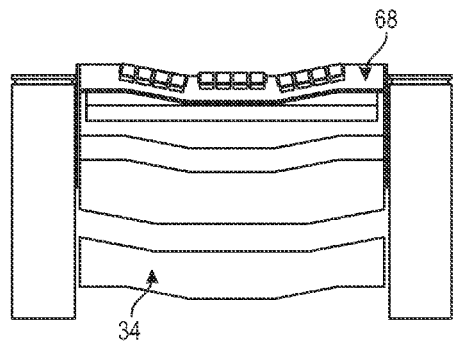
Figure 6A:
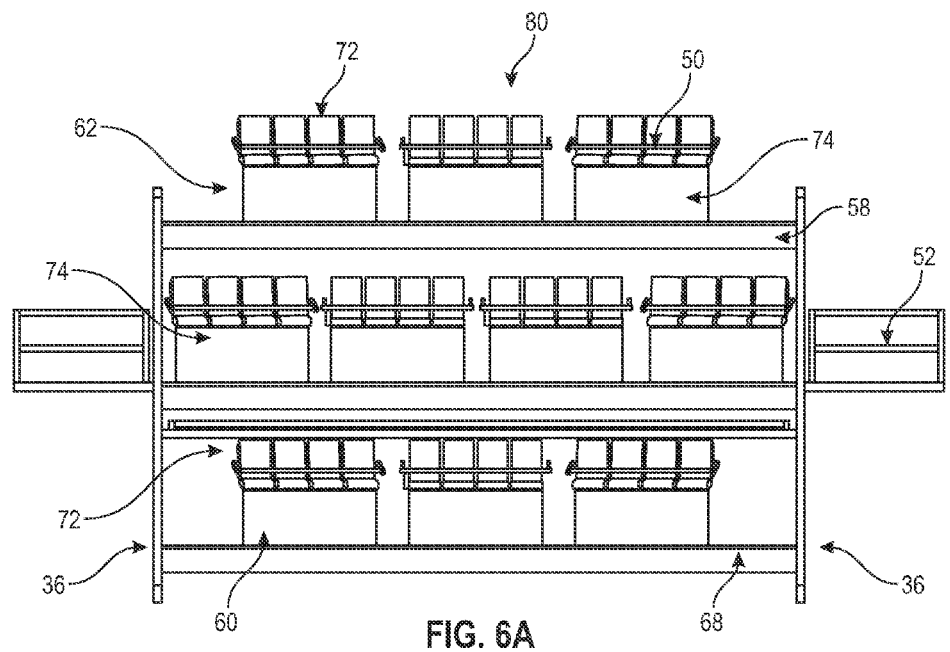
FIGS. 6A-C are front views of a seating arrangement depicting exemplary motion capabilities of the seats of an immersive theater in accordance with the invention.
Figure 6B:
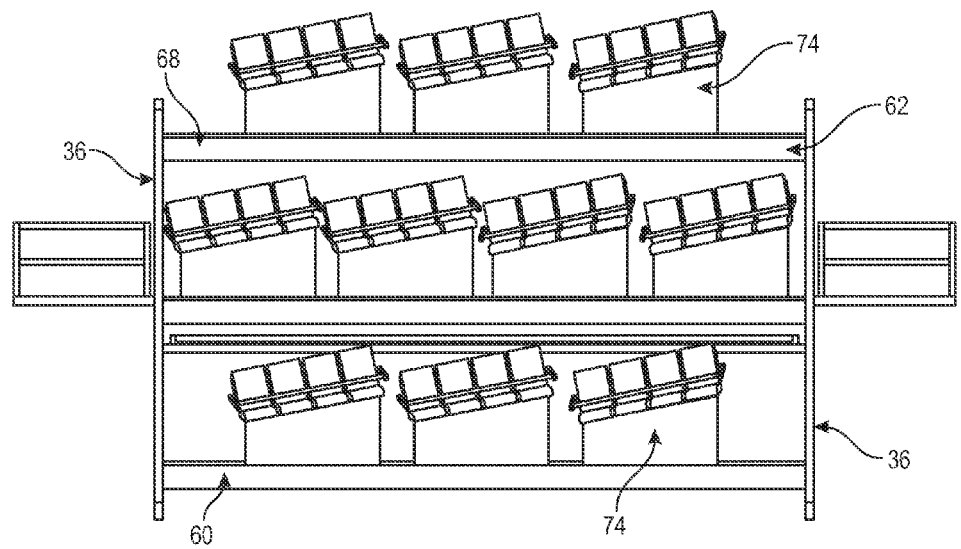
Figure 6C:
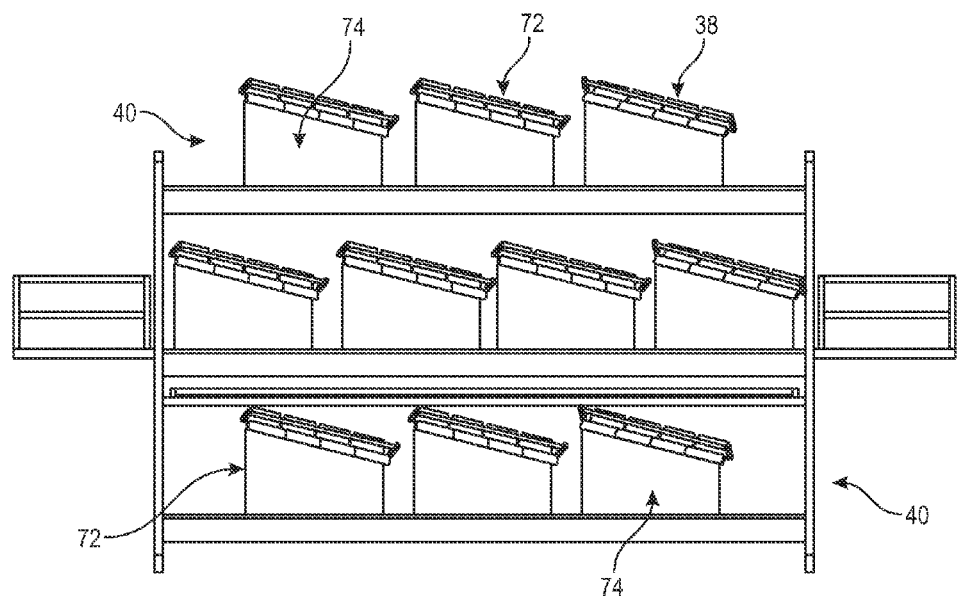

FIGS. 5A-B show the positioning of the seats 38 as they are transitioned into the viewing position. In an exemplary embodiment, the rows 40 are stacked vertically, but other variations of pitch angle exist in other alternatives. As shown in FIGS. 6A-C, each row 40 of seats 38 has a plurality of seat groups 72. Each seat group 72 is supported by a motion simulation apparatus 74. Each seat group's 72 motion simulation apparatus 74 is configured to move in the same manner as the other motion simulation apparatuses 74. FIGS. 6B-C depict a few of the numerous ranges of motion of which the motion simulation apparatus 74 is capable. The motion simulators 74 move the seats 38, and the viewers seated therein, to give the viewers the impression of movement. When conducted in concert with the images or film shown on the screen 12, the viewers will experience all the physical sensations associated with what they are viewing, for instance, flying in a fighter jet, the feeling of taking off, sharp turns, etc.

In the suspended position, the rows 40 can be stacked directly above one another (shown in FIG. 5B), angled at a positive pitch (as in the stadium-style seating arrangement of FIG. 1), or angled at a negative pitch, depending on the desired arrangement.

The use of a counterweight system 76 is beneficial because the front row(s) 60 and the back row(s) 62 counterbalance each other. In other embodiments, additional rows can be utilized without the need for significant alterations to the force required to transition the seating assembly 30 from the loading position 78 to the viewing position 80.

In alternative embodiments, the counterweight system positions the rows in a stacked arrangement. In other embodiments, the rows can be oriented into a stadium seating arrangement (angled positively), or could be oriented at a downward angle. Other embodiments have the viewers suspended in such a way that would mimic skydiving or hang gliding.

FIGS. 6A-C show the rows of seats in the viewing position in a stacked orientation. The rows 40 of seats 38 are split into groups 72 of four seats. Each group 72 of seats 38 is in line with the row 40, but there is space between each group 72 sufficient for maneuvering of each group 72 of seats 38. There is a movement apparatus 74 shown as supporting from underneath the structure of each seat group 72; however, the movement apparatus could be located anywhere, i.e. behind, above, etc., and accomplish the same. This apparatus 74 is capable of raising and lowering the seat groups 72. It can tilt the seat group 72 back and forth, side to side, and at angled pitches, depending on the desired outcome.

Figure 7A:
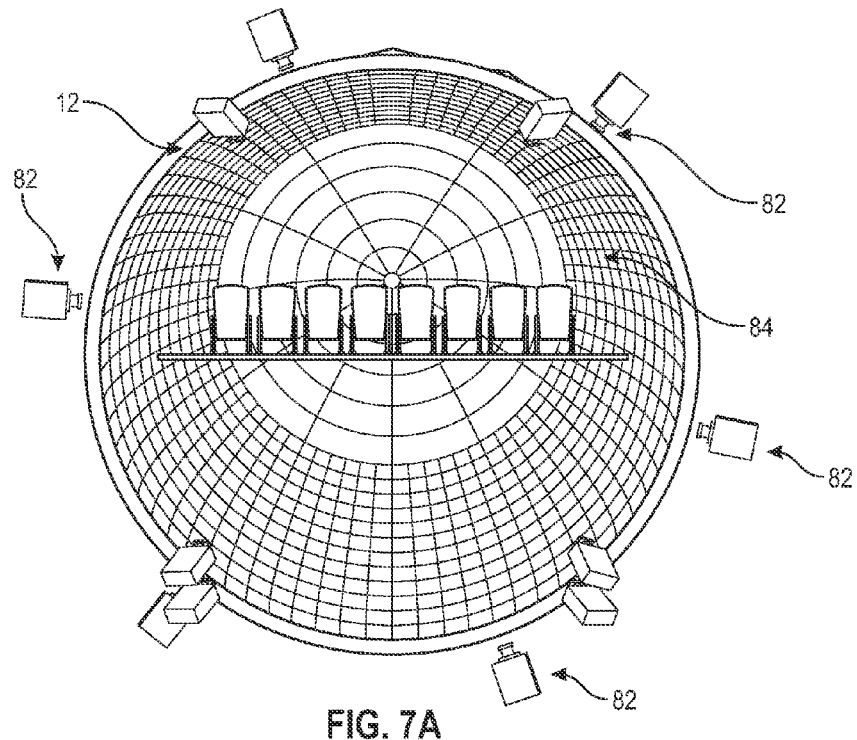
FIGS. 7A-C are perspective views of a seating arrangement and its location relative to the position of the screen of an immersive theater in accordance with the invention.
Figure 7B:
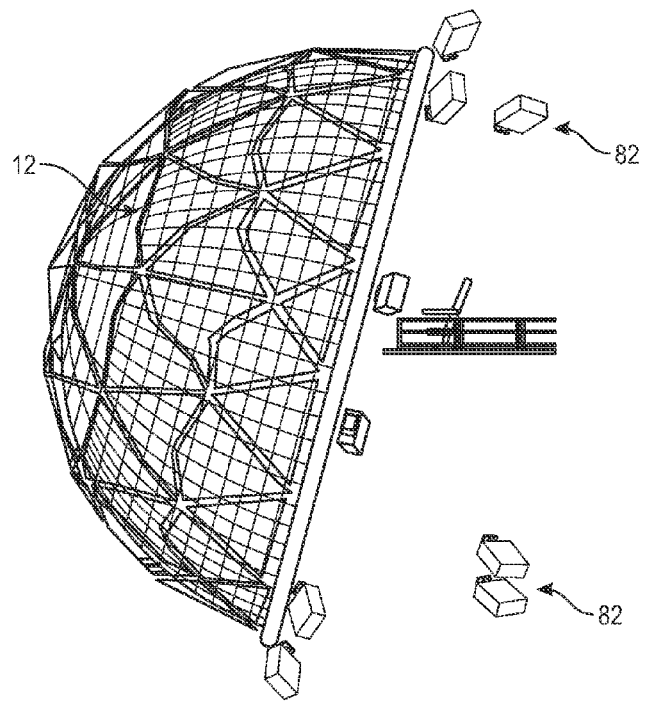
Figure 7C:
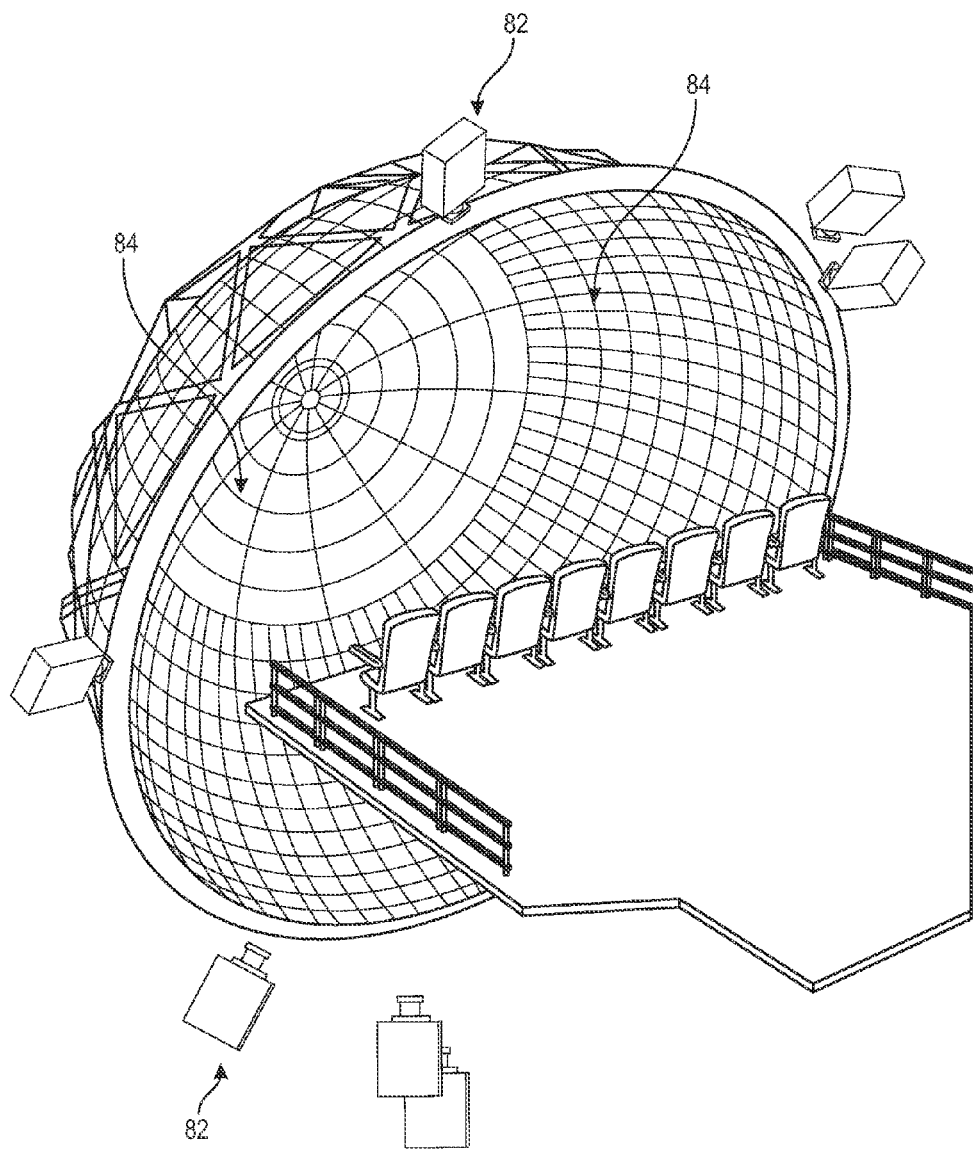
Figure 8A:
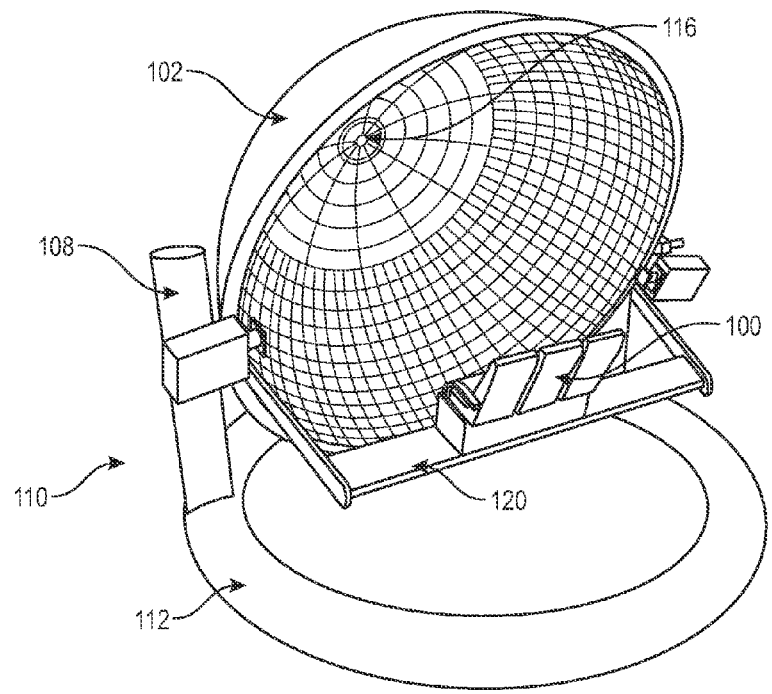
FIGS. 8A-D are sequential stages of an embodiment relating to horizontal and vertical rotation of a moveable screen/seating assembly of an immersive theater in accordance with the invention.
Figure 8B:
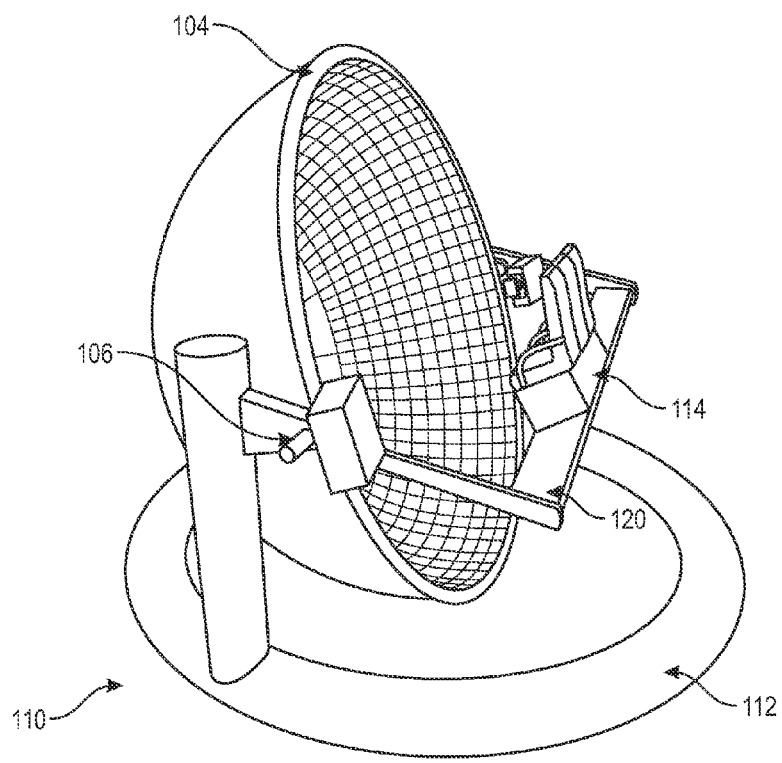
Figure 8C:
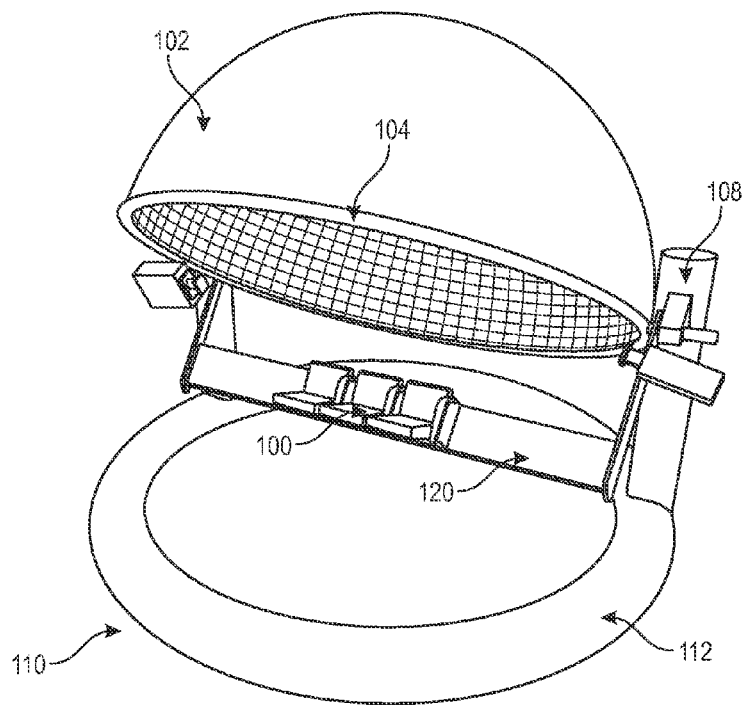
Figure 8D:
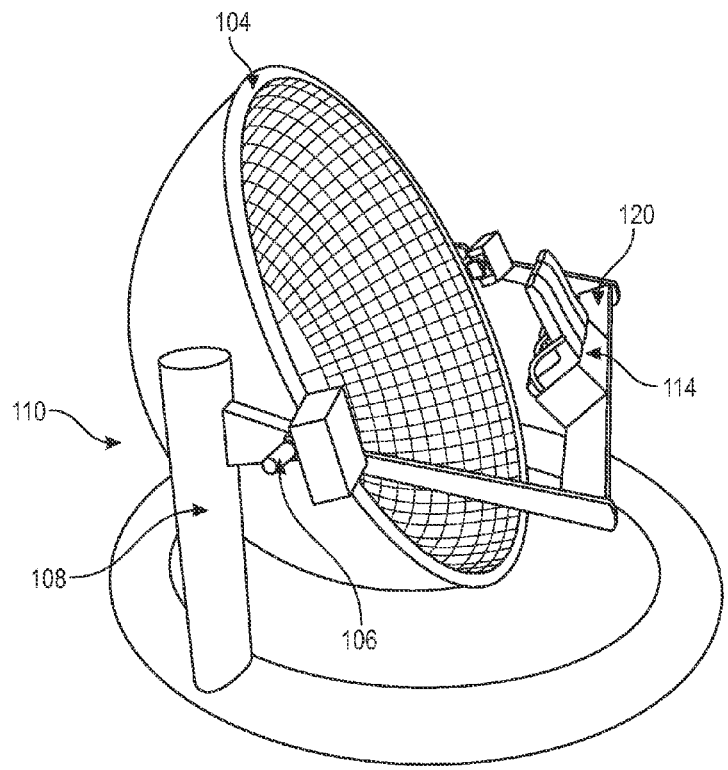

FIGS. 7A-C depict an exemplary embodiment for the arrangement of the projectors 82 for the screen 12. As shown, there is a plurality of projectors 82 aimed at the screen 12 from various angles. Each projector's 82 projection occupies a segment of the screen 12 and each segment of the screen 12 overlaps with adjacent segments in order to provide a seamless image as projected from the projectors 82. The system supports two 4K projectors with a total of sixteen synchronized outputs and synchronized multichannel audio. The media and real-time render resolution is 4096×4096 stereo at 60 Hz. There are at least two primary servers and one audio server.

The projectors and the seating area are positioned relative to one another to avoid casting shadows on the screen. For example, the seats can be located distal from the outer edge 26 (FIG. 1) of the screen, with projectors 82 disposed in spaced relationship thereabout.

In other embodiments, the screen can exclude the use of a projector(s) entirely. For example, the screen can comprise one or more LED displays or fiber optic cloth. In this configurations, the seats can be positioned forward of the outer edge 26 (FIG. 1) of the screen, which can enhance the immersive effect when shadows are not cast from the seating positions.

FIGS. 8A-D depict another embodiment for an immersive theater in accordance with the invention in which a seat area 100 and a screen 102 are mounted for controlled, sequenced movement. Each figure shows examples of the range of motion of the seating area 100 with the screen 102. In the exemplary embodiment, the seating area 100 and the screen 102 are configured to move in unison via a rotational support assembly 110.

The screen 102 is three-dimensional and concave, as described above. The screen 102 has a support lip 104 that is attached at horizontal pivot points 106. There is a pivot point 106 on each side of the screen 102 at the outer edges along the center. These pivot points 106 allow the screen to tilt forward or backward at a wide range. The pivot points 106 on the screen are each connected to a pivot support stand 108 of the rotational support assembly 110. The rotational support assembly 110 further comprises a base frame (e.g., circular base 112) that is capable of rotating the seating area 100 and the screen 102 in unison along a vertical axis to provide a sensation of sideways movement to the viewers.

The horizontal pivot points 106 of the screen are connected to a seating support system 114 for the seating area 100 via a supporting structure 120 such that when the screen 102 is tilted forward, the seating area is tilted simultaneously, and relatively, in order to maintain the normal with the central axis line 116. The rotational support assembly 110 rotates the screen 102 and seating area 100 simultaneously, giving a sense of rotational movement to the viewers without changing the view relative to the central axis line 116 of the screen. The screen 102 and seating area 100 can be tilted and rotated in unison in order to provide a dramatic sensation of movement to the viewers without altering their alignment with the central axis point 116 of the screen 102.

The movement of the rotational theater embodiment can be synced with the film displayed on the screen so that the seating area 100 and screen 102 are moving in a realistic manner relative to what is depicted on the screen. Alternatively, the movement of the rotational theater can be controlled by the viewer. In this scenario, the rotational theater would be ideally used as a flight simulator. The projection on the screen would be similar to that of a video game, wherein the display changes according to the inputs from the user. In the context of the rotational theater, if the user pushed the joystick forward and to the left, the screen and seats would tilt in unison, and the rotational system would rotate to give the physical sensation of moving downward and to the left. The images displayed on the screen would provide the visual sensation of direction of travel relative to the physical sensation of movement. This provides the ultimate pairing of movement and visual stimulation that, when combined with the immersive theater aspects discussed above, allows for very realistic simulation.

It should be appreciated from the foregoing that the present invention provides an improved immersive theater by orienting the screen relative to the seating area in the manner described in detail above.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. A theater comprising:
    a three-dimensional, concave shaped screen having an outer peripheral edge, the screen defining a central axis that extends perpendicularly from a center point of the concave screen, the screen oriented at a prescribed nonzero pitch angle ($\alpha$) relative to a horizontal plane through said screen; and
    a seating area having a plurality of seats for viewers, the seating area having a stacked arrangement along a planar region and pitched at a prescribed angle ($\beta$); the seating area confined within a viewing area that is centered on the central axis of the screen;
    wherein the seats are separated into rows; the rows are separated into seat groups; each seat group having a plurality of seats, and a motion simulation apparatus supporting each seat group; the motion simulation apparatus capable of moving each seat group, in unison, up and down, back and forth, and tilting the seat groups to various angles, pitches, and orientations to achieve a desired feeling on an audience.

2. The theater as defined in claim 1, wherein the prescribed pitch angle alpha ($\alpha$) is between 5 and 25 degrees relative to the horizontal; whereby the central axis is directed downward towards the viewers, such that the screen is disposed substantially above the seating area.

3. The theater as defined in claim 1, wherein the seating area provides the seats fixed in tiered rows, such that the pitch of the seating area is transverse to the central axis of the screen.

4. The theater as defined in claim 1, wherein the seats of the seating area are spaced from the outer peripheral edge of the screen by at least ⅓ of the radius of the screen.

5. The theater of claim 1, wherein the seats are arranged in rows; the orientation of the rows having a nonzero curvature ($\delta\theta$) relative to the screen.

6. The theater of claim 1, wherein one or more viewers may control the motion simulation apparatus.

7. The theater as defined in claim 1, further comprising a plurality of projectors aimed at the screen from various angles, wherein each projector's projection occupies a segment of the screen; each segment of the screen having an overlap with adjacent segments in order to provide a seamless image as projected from the projectors.

8. The theater as defined in claim 1, wherein the seating area further separated into a first seating area and a second seating area coupled to each other, defining an axis of rotation between the first seating area and the second seating area, such that the seating areas rotate about the axis of rotation causing the first seating area to raise and the second seating area to lower, to achieve a viewing orientation in which the first and second seating areas are positioned at a prescribed pitch angle ($\beta$).

9. A theater comprising:
    a three-dimensional, concave shaped screen having an outer peripheral edge, the screen defining a central axis that extends perpendicularly from a center point of the concave screen, the screen oriented at a prescribed nonzero pitch angle ($\alpha$) relative to a horizontal plane through said screen; and
    a seating area having a plurality of seats for viewers, the seating area having a stacked arrangement along a planar region and pitched at a prescribed angle ($\beta$); the seating area confined within a viewing area that is centered on the central axis of the screen;
    wherein the seats are separated into rows; at least one of the rows is movable, such that the at least one row is transitioned from a flat loading position to a suspended viewing position via a counter-balance system.

10. The theater as defined in claim 9, wherein the prescribed pitch angle alpha ($\alpha$) is between 5 and 25 degrees relative to the horizontal; whereby the central axis is directed downward towards the viewers, such that the screen is disposed substantially above the seating area.

11. The theater as defined in claim 9, wherein the seating area provides the seats fixed in tiered rows, such that the pitch of the seating area is transverse to the central axis of the screen.

12. The theater as defined in claim 9, wherein the seats of the seating area are spaced from the outer peripheral edge of the screen by at least ⅓ of the radius of the screen.

13. The theater as defined in claim 9, wherein the seating area is further separated into a first seating area and a second seating area coupled to each other, defining an axis of rotation between the first seating area and the second seating area, such that the seating areas rotate about the axis of rotation causing the first seating area to raise and the second seating area to lower, to achieve a viewing orientation in which the first and second seating areas are positioned at a prescribed pitch angle ($\beta$).

14. The theater as defined in claim 9, wherein the seating area includes seats; the seats are arranged in rows; the orientation of the rows having a nonzero curvature ($\delta\theta$) relative to the screen.

15. The theater of claim 9, wherein one or more viewers may control the motion simulation apparatus.

16. The theater of claim 9, further comprising a plurality of projectors aimed at the screen from various angles, wherein each projector's projection occupies a segment of the screen; each segment of the screen having an overlap with adjacent segments in order to provide a seamless image as projected from the projectors.

17. A theater, comprising:
    a screen assembly having a screen, the screen having an outer peripheral edge, the screen defining a central axis that extends perpendicularly from a center point of the screen, the screen attached to a screen support;

a seating area having a plurality of seats for viewers;

a seating assembly coupled to the screen support such that the seats are disposed in a fixed orientation relative to the screen;

a support structure configured to move the screen assembly and seating assembly in unison, the support structure having:

a base that controllably rotates about a vertical axis to rotate the screen assembly and the seating assembly; and a first support arm projecting up from the base, the support arm having a controllable pivot attached to the screen support, rotatable about a horizontal axis to rotate the screen assembly and the seating assembly about the horizontal axis.

18. The theater as defined in claim 17, wherein the screen support is configured as a structural lip about a peripheral edge of the screen assembly.

19. The theater as defined in claim 18, wherein the seating area is coupled to the structural lip so as to move the seating area with the screen in unison.

20. The theater as defined in claim 17, wherein the screen is three dimensionally concave, and the seating area is positioned relative to the screen such that the seating area is aligned with the central axis of the screen.

21. The theater as defined in claim 17, wherein the seats are arranged in rows; the orientation of the rows having a curvature ($\delta\theta$) relative to the screen.

22. The theater as defined in claim 17, wherein the seating area is spaced from a peripheral edge of the screen by at least ⅓ of the radius of the screen.

23. The theater as defined in claim 17, the support structure further having a second support arm projecting up from the base on an opposing side of the screen assembly, the second support arm having a controllable pivot attached to the screen support to rotate the screen assembly about a horizontal axis and the seating assembly about the horizontal axis.

24. The theater of claim 17, wherein one or more viewers may control the rotation of the screen assembly and the seating assembly.

* * * * *